Jan. 11, 1938.  I. DION  2,104,856
EXPANSION JOINT FOR RAILS
Filed May 21, 1937  2 Sheets-Sheet 2
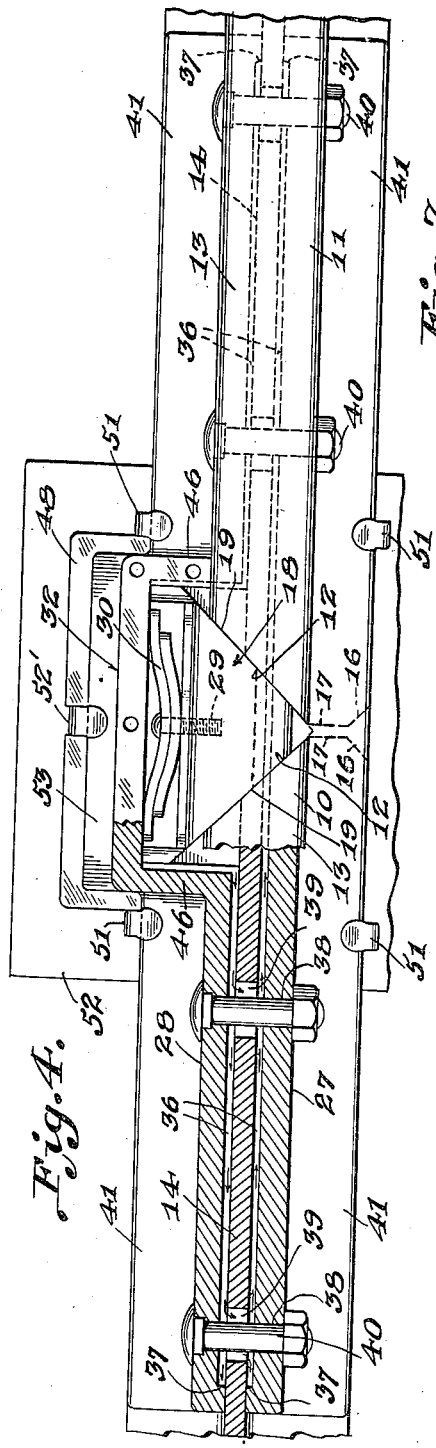
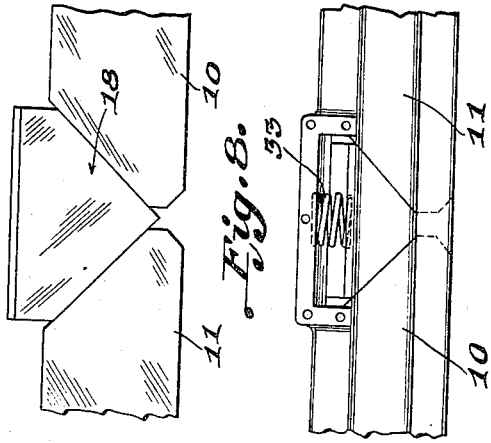
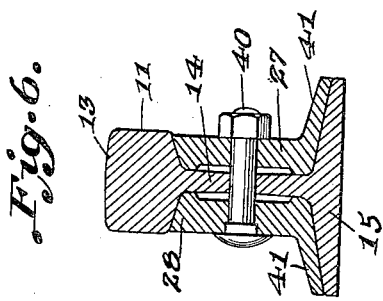
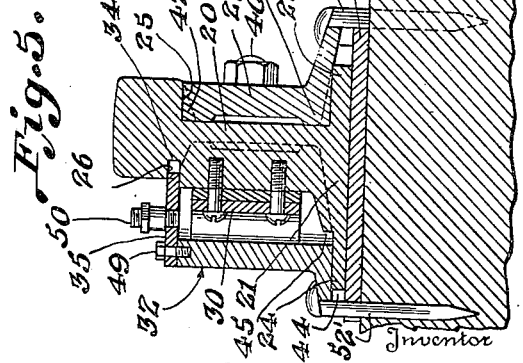
Inventor
Isaie Dion
By Harold C. Thome
Attorney Patented Jan. 11, 1938

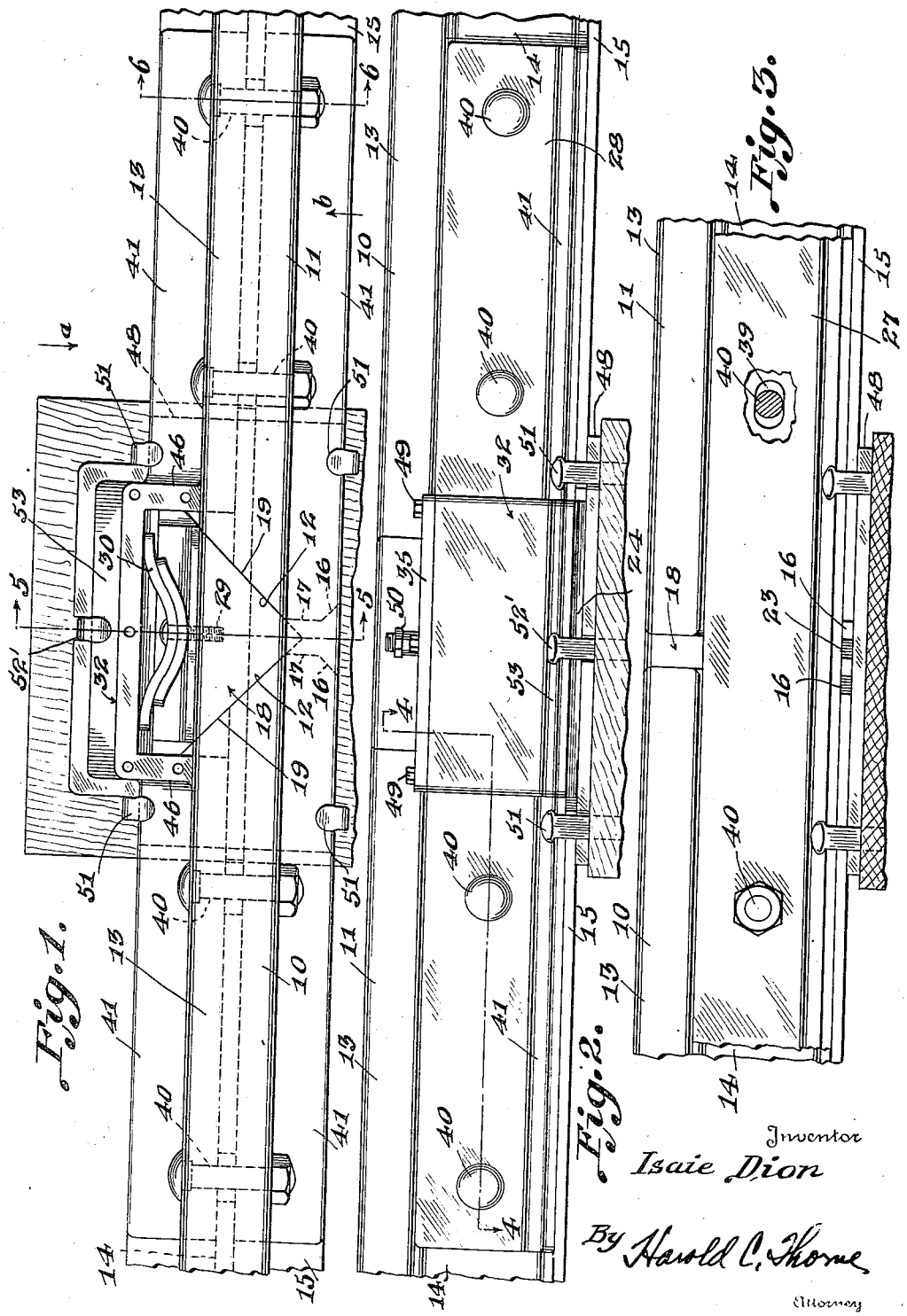

2,104,856

UNITED STATES PATENT OFFICE 2,104,856

EXPANSION JOINT FOR RAILS

Isaie Dion, Fall River, Mass.

Application May 21, 1937, Serial No. 144,063

10 Claims. (Cl. 238—223)

This invention relates to expansion joints particularly adapted for use at intervals along railway rails with the primary purpose of compensating for expansion and contraction of the rails and providing for a rigid and smooth track throughout its length.

Railroad tracks may be laid with welded joints or other rigid connecting means for the rails for considerable lengths of rails but in order to maintain the rails in proper condition it is essential to provide for expansion and contraction at intervals along the length of the rails and therefore the principal object of this invention is to provide an improved expansion joint at said intervals which will provide a continuity of the smooth rail head surface with rigidity whereby rail equipment will ride smoothly over such joints.

Heretofore attempts have been made to employ shims and forms of expansible inserts at joints, and wedges in the upper portion of the heads of the rail, but in such arrangements, either there was no compensation for variations in expansion and contraction or the joints were of insufficient strength and/or rigidity to provide a joint for smooth passage of the rail equipment thereover. Furthermore in such arrangements expensive machining of the rail ends was required for engaging the various types of surface inserts or wedge formations.

According to the present invention it is the object to overcome such defects by providing a wedge insert which has substantially the rail cross section, though preferably it is of greater cross section, and the wedge formation at the rail joints may be provided by saw cuts through the rail conforming with the abutting wedge surfaces. The ends of the rails at this joint and the wedge are rigidly supported and guided so that they provide with the rails a uniform supporting surface for smooth travel of the rail equipment.

A further object of the invention is to provide an expansion joint which will be substantially closed under all conditions of movement of the members beyond the joint and held closed by a yieldable member continuously pressing the wedge between the ends of said members.

A still further object of the invention is to reduce the friction in the expansion joint members and thereby insure continuous cooperation of the parts by employing antifriction means such as a lubricant or lubrication system for the expansion joint.

Another object is to provide a joint which can be inexpensively constructed and will be efficient and durable in its operation.

Still further objects of my invention will appear in the following specification of a satisfactory and preferred embodiment of my invention applied to rail joints as illustrated in the accompanying drawings wherein,—

Figure 1 is a plan view of an expansion joint for rails in accordance with my invention with a cover removed.

Figure 2 is an outer side elevation thereof taken in the direction of the arrow $a$ in Figure 1.

Figure 3 is an inner side elevation thereof taken in the direction of the arrow $b$ in Figure 1.

Figure 4 is a plan view similar to Figure 1, partly in section taken on line 4—4 of Figure 2 showing the relation of the parts when the rails are in an expanded condition.

Figure 5 is a cross sectional view taken on line 5—5 of Figure 1.

Figure 6 is a cross sectional view taken on line 6—6 of Figure 1.

Figure 7 is a bottom plan view of the adjacent ends of the rails and the intermediate wedge members.

Figure 8 is a plan view with the cover removed showing a modified form of spring element.

Referring to the drawings in which like characters of reference denote similar parts, an expansion joint in accordance with my invention is shown connecting the adjacent ends of rails 10 and 11 which are of standard construction, and each has its end similarly formed with a diagonal surface 12 extending in a vertical plane across a substantial portion of the end of the rail, including the entire head and web portions 13 and 14 respectively and the base portion 15 of the rail or at least a major portion thereof. These surfaces 12 of the two rail ends extend in diverging directions and each may be formed by a single saw cut, the saw being guided by a mitrebox or the like, and if the cuts are made with the rails in place and in a partly contracted condition the corners 16 of the adjacent rail ends may be removed in the operation and the cuts are made to provide for the maximum expansion of the rails as determined by the portions 17 of the ends which will not engage under any normal maximum expansion of the rail members.

The wedge shaped recess defined by the surfaces 12 at the ends of the rails is preferably formed by the cuts each at 45 degree angles with respect to the sides of the rail and may be formed in any manner. This recess is occupied by a wedge block 18 which may be formed similarly from a rail with its end surfaces 19 formed so as to engage the end surfaces 12 of the rail and slide laterally with respect thereto. However this wedge block, preferably, is specially constructed having a heavier web section 20 with its base portion 21 having its lower surface lying in the same plane as that of the bases of the abutting rail heads. The base portion 21 has its outer edges 23 and 24 of uniform thickness for a short distance inwardly and the head portion also has under surfaces 25 and 26 at its sides parallel to the surface of the under surface of the base,—these surfaces cooperate with the rail connecting elements 27 and 28 for guiding and supporting the wedge block in proper relation with respect to the ends of the rail so that the upper surface of its head always presents a smooth continuation of the rail surface in any position of expansion or contraction of the rails. The thickened web section 20 increases the rigidity of the wedge block and is provided with fastening elements 29 for securing a spring 30 thereto. This spring 30 is preferably in the form of a leaf spring having its ends engaging the wall 31 of a box formation 32 in connecting element 28, though this spring may be in the form of a coil spring 33 as shown in Figure 8. The web and head portions are provided with a groove 34 therebetween which receives a cover 35 for box 32 and effectively seals the same to prevent the entry of foreign matter.

The rail connecting elements 27 and 28 are generally of the splice bar or "fish plate" formation having longitudinal grooves 36 therein which preferably may be closed at remote ends as indicated at 37. Connecting members 27 and 28 are each provided with the usual bolt receiving apertures 38 and the web portions 14 of the rails are provided with enlarged bolt receiving apertures which are shown as longitudinal slots 39 permitting a limited longitudinal movement of the rail ends between the connecting members while the connecting members are secured by means of usual bolt members 40 passing through the bolt receiving apertures. The connecting members 27 are preferably formed at the upper edges to engage the heads 13 of rails 10 and 11 and lower extending flanges 41 for engaging the base portions 15 of the rails. Connecting member 27 has an upper machined projection 42 which engages the surface 25 of wedge block 18 and a lower machined projection 43 which engages the outer edge 23 of the base of the wedge block. Connecting element 28 is provided with the intermediate box structure 32, the outer side wall of which has a lower recess 44 which snugly engages the outer edge 24 of the base of the wedge block and permits limited outward movement therethrough; this movement is sufficient to take care of any expansion of the rails as provided for by this expansion joint, the limit of movement being determined by the upwardly extending portion 45 of the block toward the wall of the box. Beyond the recess 44 the outer side wall and end walls 46 extend to the plane of the lower surface of the rail and wedge block bases and the lower portion of these members is sealed by a base plate 48 upon which the rails 10 and 11 and wedge block 18 are slidingly supported. The box structure 32 is thus adequately sealed to provide a lubricant supply chamber and its upper portion is closed by the cover 35 which may be secured to the upper part of the box structure of the connecting element 28 by means of screws or bolts 49 so that it may be removed when desired.

This cover 35 may be removed for filling the box with grease or a lubricant duct 50 may be provided for the box and arranged in the cover member 35 or elsewhere whereby lubricant may be forced therethrough whenever it is desired to replenish the lubricant supply. It will be seen that the lubricant will pass from the box 32 to the various parts of the joint, the grooves 36 of the connecting members and rail bolt openings 39 through the webs 14 of the rails providing lubricant ducts. The lubricant also passes between the surfaces 12 and 19 of the rails 10 and 11 and wedge block 18 respectively and will provide these surfaces with antifriction means whereby the wedge block will move freely from the position shown in Figure 1 to that shown in Figure 4 and will freely reciprocate in accordance with the expansion and contraction of the rails. The lubricant also enters between the surfaces of the base of the wedge and rails and the base plate whereby the entire expansion joint is maintained as free from friction as possible and the relative movement of the members is maintained to provide a continuity of the head surface of the rails for smooth passage of the rail equipment thereover.

The rails are secured in the usual way to cross ties by means of rail bolts or spikes 51, a tie 52 being employed at the position of the expansion joint and the spikes 51 engaging the flanges 41 of the connecting member. Spikes 52' also engage a flange 53 forming a continuation of the flange 41 around the box 32 in connecting member 28. It will thus be seen that these securing means maintain the joint and base member 48 in sealed and rigid position and the wedge block 18 is always maintained rigidly in position to maintain continuity of the rail tread. It will be seen also that the wedge block 18 is a rigid structure extending from the base of the rails and is also guided and supported by the base plate for the rails and connecting members 27 and 28 in any of its laterally adjusted positions as effected by the lengthwise expansion and contraction of the track rails.

It will be obvious to those skilled in the art that various changes may be made in this device without departing from the spirit of the invention and therefore the invention is not limited to what is shown in the drawings and described in the specification but only as indicated in the appended claims.

I claim:

1. An expansion joint for the meeting ends of rails and the like comprising a wedge shaped block having a cross section substantially equal to or exceeding the cross section of the rails and a tread portion level with the treads of the rails, said rails having their ends formed so as to cooperate with said block, connecting means secured to the rails in which the rail ends and wedge block are guided in their movements, said means including a box structure in sealing relation with other parts of the rail joint to provide a lubricant chamber, and means within the box structure and in engagement with the block continuously urging said block laterally into engagement with the ends of the rails during expanding and contracting endwise movements of the rails.

2. An expansion joint for the meeting ends of rails and the like comprising a wedge shaped block having a cross section substantially equal to or exceeding the cross section of the rails and a tread portion level with the treads of the rails, said rails having their ends formed so as to cooperate with said block, a base plate upon which said rail ends and wedge block are slidingly supported, connecting means secured to the rails in which the rail ends and wedge block are guided in their movements, said connecting means including an enclosing box structure engageable with the base plate and cooperating with the wedge member in a sealing relationship to provide a lubricant chamber, and means within the box structure and in engagement with the block continuously urging said block laterally into engagement with the ends of the rails during expanding and contracting endwise movement of the rails.

3. An expansion joint for the meeting ends of rails and the like comprising a wedge shaped block having a cross section substantially equal to or exceeding the cross section of the rails and a tread portion level with the treads of the rails, said rails having their ends formed so as to cooperate with said block, a base plate upon which said rail ends and wedge block are slidingly supported, connecting means secured to the rails in which the rail ends and wedge block are guided in their movements, a box formation in the connecting means on one side of the rails with which said block cooperates in a sealing relationship to provide a lubricant chamber and by which it is guided and into which it is moved by the expansion of the rail members, and spring means engaging said box and the side of the block continuously urging said block laterally into engagement with the ends of the rails during expanding and contracting endwise movements of the rails.

4. An expansion joint for the meeting ends of rails and the like comprising a wedge block having a head portion with an upper surface coinciding with the upper surface of the rail heads, a web portion and a base portion, said rails having their ends formed so as to cooperate with the block, connecting members secured to the rails one of said connecting members having intermediate portions of the upper and lower edges thereof continuously in engagement with an under surface of the head portion on one side of the block and upper surfaces of the base portion on said side of the block, the other of said connecting members having a laterally extending box structure in sealing relationship with other elements of the joint to provide a lubricant chamber, a cover enclosing the upper portion of said box structure and having its upper surface in engagement with an under surface of the head of the block, and means in the box structure of the connecting members continuously urging said block into engagement with the ends of the rails during expanding and contracting endwise movements of the rails.

5. An expansion joint for the meeting ends of rails and the like comprising a wedge shaped block having a cross section substantially equal to or exceeding the cross section of the rails and a tread portion level with the treads of the rails, said rails having their ends formed so as to cooperate with said block, a base plate upon which said rail ends and wedge block are slidingly supported, connecting means secured to the rails in which the rail ends and wedge block are guided in their movements, a box formation in the connecting means on one side of the rails by which said block is guided and into which it is moved by the expansion of the rail members, said box having its lower portion in continuous engagement with the base plate and relatively movable portion of the wedge block substantially sealing the same to provide a lubricant receptacle, and spring means engaging said box and the side of the block continuously urging said block laterally into engagement with the ends of the rails during expanding and contracting endwise movements of the rails.

6. An expansion joint for the meeting ends of rails and the like comprising a wedge shaped block having a cross section substantially equal to or exceeding the cross section of the rails and a tread portion level with the treads of the rails, said rails having their ends formed so as to cooperate with said block, a base plate upon which said rail ends and wedge block are slidingly supported, connecting means secured to the rails in which the rail ends and wedge block are guided in their movements, a box formation in the connecting means on one side of the rails by which said block is guided and into which it is moved by the expansion of the rail members, said box having its lower portion in continuous engagement with the base plate and relatively movable portion of the wedge block substantially sealing the same to provide a lubricant receptacle, spring means engaging said box and the side of the block continuously urging said block laterally into engagement with the ends of the rails during expanding and contracting endwise movements of the rails, a cover member for the upper portion of the box substantially sealing the receptacle, and means whereby lubricant may be introduced into said box.

7. An expansion joint for the meeting ends of rails and the like comprising a wedge shaped block having a cross section substantially equal to or exceeding the cross section of the rails and a tread portion level with the treads of the rails, said rails having their ends formed so as to cooperate with said block, a base plate upon which said rail ends and wedge block are slidingly supported, connecting means secured to the rails in which the rail ends and wedge block are guided in their movements, a box formation in the connecting means on one side of the rails by which said block is guided and into which it is moved by the expansion of the rail members, said box having its lower portion in continuous engagement with the base plate and relatively movable portion of the wedge block substantially sealing the same to provide a lubricant receptacle, spring means engaging said box and the side of the block continuously urging said block laterally into engagement with the ends of the rails during expanding and contracting endwise movements of the rails, and a removable cover for said box having its inner side edge continuously in engagement with the sides of the head adjacent the rail ends and with an upper portion of the wedge block.

8. An expansion joint for the meeting ends of rails and the like comprising a wedge shaped block having a cross section substantially equal to or exceeding the cross section of the rails and a tread portion level with the treads of the rails, said rails having their ends formed so as to cooperate with said block, a base plate upon which said rail ends and wedge block are slidingly supported, connecting means secured to the rails in which the rail ends and wedge block are guided in their movements, a box formation in the connecting means on one side of the rails by which said block is guided and into which it is moved by the expansion of the rail members, said box having its lower portion in continuous engagement with the base plate and relatively movable portion of the wedge block substantially sealing the same to provide a lubricant receptacle, spring means engaging said box and the side of the block continuously urging said block laterally into engagement with the ends of the rails during expanding and contracting endwise movements of the rails, and said connecting members being so formed as to provide ducts for conveying lubricant from the lubricant receptacle to all relatively movable parts of the expansion joint.

9. The combination with an expansible joint for rails and the like, comprising an element having an upper surface coinciding with the upper surface of and movable between the rail ends at the joint to compensate for expansion and contraction movements and connecting elements for the rail ends on each side of the rails, of lubricating means for the joint for supplying lubrication between the relatively moving parts of the joint comprising a lubricant chamber formed by one of the connecting elements and conduits extending lengthwise therefrom and through the rail webs.

10. The combination of an expansion joint for rails and the like including connecting elements on the sides securing the meeting ends of the rails and permitting endwise movement of the rails with respect thereto and to each other, one of the connecting elements forming lubricating means for supplying lubricant to the relatively movable parts of the joint, and conduits for conveying the lubricant from said lubricating means extending lengthwise of the connecting elements and from one connecting element through apertures in the rails to the other connecting element.

ISAIE DION.